(12) United States Patent
Zechner

(10) Patent No.: US 7,142,297 B2
(45) Date of Patent: Nov. 28, 2006

(54) METHOD FOR SIMULATING THE MOVEMENT OF PARTICLES

(75) Inventor: Christoph Zechner, Zurich (CH)

(73) Assignee: Synopsys Switzerland LLC, Zurich (CH)

(*) Notice: Subject to any disclaimer, the term of this patent is extended or adjusted under 35 U.S.C. 154(b) by 378 days.

(21) Appl. No.: 10/697,982

(22) Filed: Oct. 31, 2003

(65) Prior Publication Data

US 2005/0094141 A1    May 5, 2005

(51) Int. Cl.
  *G06F 7/60* (2006.01)
  *H01L 29/76* (2006.01)
  *H01L 21/66* (2006.01)
  *G01N 15/02* (2006.01)

(52) U.S. Cl. .................. 356/335; 703/2; 703/4; 438/17; 257/66; 257/E21.133

(58) Field of Classification Search ................ 356/335; 703/2, 4, 5; 438/17, 18, 514, 530, 542; 257/66, 257/67, E21.133
See application file for complete search history.

(56) References Cited

U.S. PATENT DOCUMENTS 6,154,717 A * 11/2000 Kumashiro .................... 703/2
6,483,594 B1 * 11/2002 Borden et al. ............... 356/502

FOREIGN PATENT DOCUMENTS

EP    0862126    2/1998
EP    0864991    3/1998

OTHER PUBLICATIONS

M. Orlowski, New model for dopant redistribution at interfaces, Oct. 1989, Appl. Phys. Lett., 55 (17), pp. 1762-1764.*
Bufler et al, Monte Carlo simulation and measurement of nanoscale n-MOSFETs, Feb. 2003, IEEE, 50 (2), pp. 418-423.*
Bufler et al, Single-particle approach to self-consistent Monte Carlo device simulation, Mar. 2003, IEICE Trans. Electron,, E86-C (3), pp. 308-312.*
G.L. Olson et al.: Kinetics of solid phase crystallization in amorphous silicon; Material Science Reports; vol. 3, No. 1, Jun. 1988.
P.M. Fahey et al.: Point defects and dopant diffusion in silicon; Reviews of Modern Physics; vol. 61, No. 2, Apr. 1989.
A.A. Wheeler et al.: Phase-field model for isothermal phase transitions in binary alloys; Physical Review A; vol. 45, No. 10, May 15, 1992.
H.-D. Geiler, FSU Jena, GDR: Theoretical description of explosive crystallization phenomena induced by high temperature pulses in thin layers of amorphous semiconductors.
Hideki Takeuchi, Pushkar Ranade, and Tsu-Jae King: Suppression of Boron TED by Low Temperature SPC Anneal Prior to Dopant Activation; IEEE Transactions On Electron Devices, vol. 29, No. 12, Dec. 2002.

* cited by examiner

*Primary Examiner*—Layla G. Lauchman
(74) *Attorney, Agent, or Firm*—Haynes Beffel & Wolfeld LLP

(57) ABSTRACT

A method for determining the movement of particles, particularly impurities, in a medium, under the influence of a changing interface between two neighboring phases. In a first step, the temporal and/or local evolution of said interface is determined. In a second step, the movement of said particles in dependence of the temporal and/or local evolution of the phase interface as determined in the first step is calculated. Optionally, the distribution of the particles within the medium at a certain time is then determined.

31 Claims, 2 Drawing Sheets

METHOD FOR SIMULATING THE MOVEMENT OF PARTICLES

BACKGROUND OF THE INVENTION

The invention relates to a method for simulating the movement or distribution of particles in a medium under the influence of a changing phase interface between two neighboring phases in said medium and to a computer program product comprising software code to perform said simulation. A changing interface in the context of the invention means an interface which moves at least partially in the course of time.

The properties of most semiconductor devices, such as MOSFETs, are determined by the spatial arrangement of so-called dopant or (impurity) atoms, such as e.g. boron or arsenic atoms. In the absence of dopant atoms, the conductivity of the semiconductor is quite low. Regions with a high concentration of so called donor atoms (such as arsenic or phosphorus) are called n-type regions, because in such regions the concentration of negatively charged free electrons in the semiconductor is increased. Regions with a high concentration of so called acceptor atoms (such as boron or indium) are called p-type regions, because in such regions the concentration of positively charged free holes is increased. A positively charged hole can be understood as a missing electron.

In the fabrication process of semiconductor devices, such as transistors, one of the main tasks is to achieve a certain spatial distribution of dopant atoms in the device. Usually, at the beginning of a fabrication process, one starts with a semiconductor wafer with a uniform dopant concentration, and at the end of the fabrication process, one has different doping concentrations in different regions of the device.

In state-of-the art semiconductor technology, the following method is frequently used to fabricate regions with different concentration of dopant atoms:

In a first step, dopant atoms are implanted into the semiconductor crystal by so-called 'ion implantation', i.e. by shooting dopant atoms at the semiconductor with high energy. Using different ion acceleration energies, one can adjust the average depth from the semiconductor surface, at which the ions come at rest in the semiconductor. By using masks one can achieve that the implanted ions will enter the semiconductor only at desired regions.

In a second so-called annealing step, the semiconductor wafer is subject to a high temperature treatment, e.g. treating the wafer 10 seconds at 1000° C., or 1 hour at 70° C. This is necessary to heal crystal damage which is caused by ion implantation, and to electrically activate the dopant atoms, i.e. to put them into semiconductor lattice sites, which requires some thermal energy. The temperatures needed to heal the crystal damage and to activate the dopant atoms are so high, that the dopant atoms diffuse in the semiconductor crystal. Therefore, not only the crystal damage and the activation of the dopant atoms changes, but also the spatial distribution of dopant atoms may change during an annealing step.

Fabrication processes of semiconductor devices can be modeled with the help of computer simulations which are based on physical models, so called process simulations. A main goal of process simulations is to calculate accurately the distribution and the electrical activation of dopant atoms in the completed semiconductor device. This allows to compute the electrical characteristics of the devices and to study the effect of changes in the fabrication process on the device characteristics. Such process simulations are done by most of the manufacturers of integrated circuits. An example for such a process simulation can be found in the European Patent Application EP 0 864 991.

The implantation of a high dose of dopant atoms causes a lot of crystal damage to the exposed semiconductor surface. The reason is, that the incident high energy ions can collide with the semiconductor atoms, before they eventually come to rest, and kick semiconductor atoms out of their ideal lattice site. If the implantation dose is so high, that most of the semiconductor atoms in a certain volume of the silicon are kicked to some other position in the crystal, then the crystalline order of this volume is finally completely lost, and the region is considered to be amorphous. Those parts of the semiconductor wafer, which are not exposed to the ion bombardment or which are too far from the surface to be reached by the implanted ions, remain crystalline.

Upon high temperature treatment, an amorphized region of semiconductor will recrystallize. If the amorphous region is neighboring a crystalline region, the crystallization process usually occurs in the form of a solid phase epitaxial (SPE) regrowth (see e.g. G. L. Olson and J. A. Roth, 'Kinetics of Solid Phase Crystallization in Amorphous Silicon', Mat. Sci. Rep. Vol 3, Nr. 1, June 1988, pp. 1–78).

In SPE regrowth, the amorphous material crystallizes along the interface between crystalline and amorphous material. The crystalline region acts as a seed for crystallization. Starting at the interface between the amorphous and the crystalline phase, the atoms of the amorphous part are rearranged in such a way, that they extend the crystalline microstructure of the crystalline part. By this mechanism, the crystalline region becomes larger and the amorphous region becomes smaller. The interface between amorphous and crystalline structure moves towards the amorphous part of the material, until eventually the complete amorphous part is recrystallized.

The distribution of dopant atoms in the semiconductor can change in the course of time, e.g. during the SPE regrowth, either by diffusion, or by some force pushing the atoms in a certain direction. In particular, during SPE regrowth, dopant atoms, which are in the amorphous part of the device before the SPE, can be pushed in the direction of the recrystallization front. The driving force for this dopant-pushing is, that dopant atoms are in an energetically more favorable state in the amorphous region of the semiconductor. Near the crystallization front of the SPE, such dopant atoms prefer to stay at the amorphous side of the amorphous-crystalline interface, rather than being incorporated into the crystal structure of the crystalline part. In this situation, in average, each dopant atom which is originally situated in the amorphous part of the device may be shifted a certain distance until it is eventually built into the crystalline material.

This dopant redistribution during SPE can have a significant impact on the final distribution and electrical activation of dopants in semiconductor devices. Therefore, it has a significant impact on the electrical characteristics of such devices.

Until now there is no process simulation available with which it is possible to determine accurately the movement and redistribution of the dopants during annealing steps in a medium having two different phases, particularly during SPE regrowth. As annealing is very essential to the production of semiconductor devices, it is of a great interest to determine the movement or distribution of the dopants by means of a computer simulation.

SUMMARY OF THE INVENTION

It is an object of the present invention to overcome this lack of process simulation work. This and other objects are solved with a method for the simulation of the particle movement and a computer program product for performing said method, as described below.

According to the invention a method for simulating the particle movement at the interface between two phases of a medium is presented. This method is applicable to many problems involving movement of particles neighboring a phase interface, in particular it can be used to describe the dopant movement and distribution during and after SPE regrowth.

The method is applicable on any specified particles, e.g. impurities, in any medium consisting of a material having at least two neighboring phases. These phases may be e.g. different crystallization patterns, but the method would also be applicable to e.g. solid and liquid phases.

The method comprises at least two steps for determining the movement and optionally at least a third step for determining the distribution of the particles.

In a first step, the temporal and/or local evolution of the phase interface is determined.

In a second step, the movement of the particles is determined in dependence of the previously determined evolution of the phase interface.

In a preferred embodiment, the distribution of the particles at certain times during the movement is determined in a third step.

Typically, these steps are automatically performed by means of a suitably programmed computer.

Particularly, the distribution can be determined at the steady state position of the phase interface, which means that the phase interface remains constant in time and place, e.g. at the end of an annealing treatment. In the borderline case the steady state is reached only when the phase interface moves out of the medium which means that one of the phases disappears. The distribution of the particles can be preferably determined even in this borderline case.

The phase interface can be described in two different models: Either there is a smooth transition between the two phases and the interface is extended over a non zero range in the medium, or the transition is discontinuous and the interface between the phases is sharp. According to the invention, it is possible to determine the movement or the distribution of the particles on the basis of both models.

The medium and in particular the evolution of the phases can be described by a data field wherein a first value represents the first phase and a second value the second phase, and values in between describe the transition. This data field can be representing a characteristic value of the medium, e.g. if one phase is crystalline that value can be the crystallinity or a related parameter.

In a preferred embodiment, the determination of the temporal and/or local distribution of the phase interface can be calculated by an equation, in particular by a partial differential equation determining said data field. Assuming, that the first value for the first phase is 1 and the second value for the second phase is 0, a suitable differential equation is $$\frac{dC}{dt} = div(\alpha \cdot grad(C)) + \beta \cdot C \cdot (1-C) \cdot (C-\gamma)$$

wherein C is the characteristic value, div and grad are spatial differential operators and $\alpha$, $\beta$ and $\gamma$ are suitable parameters. The first term of this equation, $div(\alpha \cdot grad(C))$ is a diffusion term. One can interpret this term in the sense, that the first phase diffuses (spreads out) a bit into the second phase and vice versa, with $\alpha$ being the diffusion coefficient. The second term of this equation, $\beta * C * (1-C) * (C-\gamma)$, describes the trend, that in absence of any gradient of the characteristic value, a region, which is close to phase 1 ($1 > C > \gamma$) turns completely into phase 1 (C converges to 1), and a region which is close to phase 2 ($0 < C < \gamma$) turns completely into phase 2. The parameter $\beta$ describes, how fast the final state (C=1 or C=0) is reached, and the parameter $\gamma$ is the threshold value. The second term can be seen as an antipode of the first term, trying to establish a sharp interface between the two phases.

For $\gamma = \frac{1}{2}$, the combined effect of both terms in the equation would be, that the interface between the two phases is smeared out a bit and does not move. For $\gamma < \frac{1}{2}$, the interface would move in direction of phase 2, because the integral over the term $\beta * C * (1-C) * (C-\gamma)$ has a positive value in the transition region.

Generally, the parameters $\alpha$, $\beta$, $\gamma$ determine the width of the transition region between the phases and the time scale of the phase change at the interface.

The data field can have an influence on other data fields, e.g. the particle distribution can be described by a data field, the time evolution of which is influenced by the data field describing the characteristic value for the phases.

It is possible to determine the evolution of the phase interface by the calculation of probabilities for regions adjacent to the phase interface to switch from one phase into the other in a certain time period. Such a calculation can be performed using a monte carlo type random algorithm in a computer program.

Similarly, the movement of the particles can be alternatively calculated by a monte carlo type simulation of discrete particle hopping. For this simulation the hopping probability of a particle depends on the potential energy of the initial and the final particle position of the hopping event. The potential energy of the particle depends on the material phase.

According to an alternative embodiment of the invention, the temporal and/or local evolution of the phase interface can be described by a movement function of the discontinuity between the phases instead of setting up a data field the phase if interface is considered to be sharp.

The evolution of the phase interface and the movement and/or distribution of the particles can be calculated in dependence of a high temperature treatment of the material, e.g. an annealing treatment.

The evolution of the phase interface and/or the movement of the particles also can be calculated on the basis of a potential, i.e. energetical difference between the two phases. Further, it is possible to determine the evolution of the phase interface by calculating it in dependence of the concentration of the particles. The movement and/or distribution of the particles can be calculated in dependence of a driving force induced by the difference of potential energy in the two phases.

In an alternative embodiment the movement of the particles at a discontinuous transition between the two phases can be determined in dependence of an accumulation of particles at said transition. In this case, a particle transport which is proportional to the number of accumulated particles and to the velocity of the discontinuous transition between the two phases takes place.

In a specific case, the method can be applied on a semiconductor material, such as silicon, with at least two different phases where the particles are dopants, e.g. Arsenic, Boron, Aluminum, Indium, Phosphorous or other impurities.

It is possible that one of the phases is amorphous and the other is crystalline. Then the method can be applied to determine dopant redistribution during SPE. This allows one to study accurately the dopant redistribution during SPE and calculate effects such as Indium dose loss (i.e. movement of Indium atoms out of the silicon), Arsenic dose loss, Fluorine dose loss, Arsenic dopant activation, Boron dose loss and Boron uphill diffusion.

It is also conceivable that one of the phases is liquid and the other is solid or crystalline. The method can e.g. be applied to determine dopant redistribution during LPE (liquid phase epitaxy) regrowth or to calculate dopant redistribution during float zone purification processes.

The method can also be applied for determining the dopant redistribution during LASER annealing processes where the laser is powerful enough to melt or amorphize an illuminated region of the semiconductor material.

According to another aspect of the invention, a computer program product to perform such simulations will be provided, which is e.g. usable on a common standard personal computer.

BRIEF DESCRIPTION OF THE DRAWINGS

The method will be explained below in a detailed description referring to the drawings, wherein.

DESCRIPTION OF THE PREFERRED EMBODIMENTS

Figure 1:
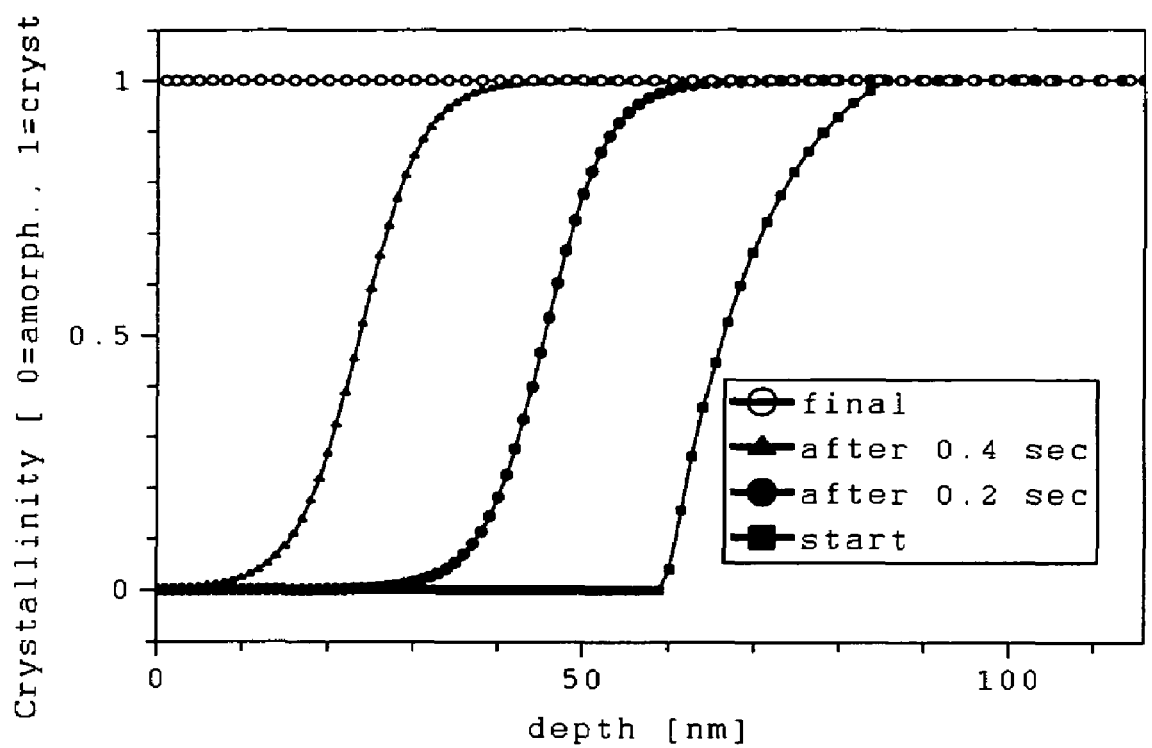
FIG. 1 is a simulated evolution of the phase interface between an amorphous and a crystalline phase of a silicon device before, during and after SPE regrowth.

As a practical embodiment of the method, the calculation for dopant redistribution during SPE regrowth will be presented in detail. It has been implemented in the process simulator FLOOPS (FLOOPS User Manual, Release 9.0, ISE Integrated System Engineering AG, Zurich, Switzerland, 2003). In this example the high temperature annealing of a silicon wafer is considered, parts of which have been amorphized by the implantation of indium atoms at a dose of $10^{15}$ atoms per cm$^2$ and an implantation energy of 15 keV. After the ion implantation, a temperature treatment of up to 2 minutes at 600° C. is considered, during which SPE regrowth occurs.

The following sequence of two subsequent process steps, which can be part of a fabrication process of a silicon device, is assumed:

i. Ion implantation of indium atoms at a dose of $10^{15}$ atoms per cm$^2$ and an implantation energy of 15 keV.

ii. High temperature annealing of the silicon wafer, which leads to recrystallization of the amorphous region. A high temperature treatment at 600° C. is assumed, which is a typical temperature for oxide deposition steps in semiconductor device fabrication.

The method is used to calculate the final dopant distribution after these steps. The procedure for determining the final dopant distribution is the following:

a) Calculation of the distribution of the dopant ions after the ion implantation.

b) Calculation of the crystal damage after ion implantation. In particular: Calculation of which part of the silicon is amorphous, and which part of the silicon is crystalline.

c) Calculation of a data field 'crystallinity', which describes the crystal order of the silicon, after the ion implantation. In amorphized regions, the value of this data field is 0, in perfectly crystalline regions, the value of the data field is 1, in crystalline regions with high crystal damage the value is between 0 and 1 which represents the phase transition region.

These first three steps serve to calculate the data fields 'dopant concentration' and 'crystallinity' after the ion implantation. The next two steps serve to calculate the time evolution of these data fields during the SPE regrowth:

d) Calculation of the time evolution of the data field crystallinity during SPE regrowth. The recrystallization process is reflected in the model by an increase of the value of the crystallinity field from 0 (amorphous) to 1 (crystalline).

e) Calculation of dopant movement during high temperature treatment, including the SPE regrowth. This calculation takes into account that a gradient of the crystallinity field can act as a driving force for dopant movement. In addition, the usual driving forces for dopant movement, as e.g. described in 'P. M. Fahey et al., Point Defects and Dopant Diffusion in Silicon, Review of Modern Physics, Vol. 61, No. 2, pp. 289–384, 1989', are also taken into account. These include dopant diffusion due to gradients of dopants and/or silicon point defects, and dopant drift due to the electric field.

All five steps serve to calculate the distribution of dopant atoms at a certain time, especially the final distribution in the steady state at the end of the thermal treatment. During the high temperature treatment, the time evolution of the crystallinity and of the dopant concentration data fields is calculated by solving a set of partial differential equations which describe the time evolution of these fields. The partial differential equations are solved for a discrete mesh of points in space and time, using standard methods of process and device simulation.

Below, the above five steps will be explained in more detail, with a focus on the steps c–e.

The dopant distribution after ion implantation can be calculated by major commercial process simulation tools used in the simulation of silicon device fabrication, such as DIOS or FLOOPS (DIOS User Manual, FLOOPS User Manual, Release 9.0, ISE Integrated Systems Engineering AG, Zurich, Switzerland, 2003), or it can be calculated by monte carlo simulation i.e. tracing a large number of ions through the silicon taking into account random collisions with silicon atoms and energy loss, or by using analytical formulas, which relate the range and distribution of ions in silicon to the implantation parameters such as dose, energy, tilt angle. Both methods are well-established standard methods. As a result of this calculation, one obtains a data field, which describes the as-implanted distribution of implanted atoms in the silicon device.

The crystal damage is related to the number of silicon atoms kicked out from the ideal crystal lattice position to some other place in the silicon. It can be calculated by tracing a high number of ions on their way through the silicon and count the number of collisions which result in a knock-out of silicon atoms, or—alternatively—by using analytical formulas, which relate the amount and the spatial distribution of the crystal damage to the implantation conditions.

As for the calculation of the dopant distribution after implantation, the calculation of the crystal damage is also a standard technology offered by major commercial process simulation programs, such as DIOS or FLOOPS (DIOS User Manual, FLOOPS User Manual, Release 9.0, ISE Integrated Systems Engineering AG, Zurich, Switzerland, 2003). Therefore the details of this procedure are not described here. The crystal damage after ion implantation is stored in a data field 'crystal damage'.

Regions, where the crystal damage (i.e. the concentration of displaced silicon atoms) exceeds a certain threshold, e.g. if more than 20% of the silicon atoms are displaced, are considered as amorphized.

A data field, later on referred as crystallinity, is introduced to describe which parts of the device are crystalline and which are amorphous. Later, the time evolution of this field is used for calculating the movement, i.e. the local evolution, of the interface between the crystalline and the amorphous phase. In this example it is assumed, that between perfectly crystalline and completely amorphous regions, an extended transition region may exist, in which the field changes steadily from 1 to 0.

After ion implantation, the data field crystallization is initialized by the following prescription.

First, two threshold values are defined for the crystal damage from ion implantation. The upper threshold corresponds to a displacement of (e.g.) 20% of the silicon atoms. The lower threshold corresponds to a displacement of (e.g.) 2% of the silicon atoms.

Then, regions, where the calculated crystal damage after ion implantation exceeds the upper threshold, are considered amorphous. In such regions, the initial value of the crystallization data field is set to 0. Regions, where the calculated damage is smaller than the lower threshold are considered as crystalline. Here, the initial value of the crystallization is set to 1. In regions, where the calculated crystal damage is between the two threshold values, the initial value of the crystallinity field changes steadily from 0 to, according to the formula:

crystallization=('crystal damage'–'lower threshold')/
('upper threshold'–'lower threshold')

This means that the crystallization is calculated as the quotient between the difference of the crystal damage and the lower threshold on the one hand and the difference of the two threshold values on the other hand. These regions represent the smooth transition between the crystalline and the amorphous part, and typically extend over 5–20 nm, depending on implantation conditions.

According to this embodiment, in the process simulation of a high temperature treatment (including diffusion, oxidation, annealing steps), the time evolution of the crystallinity is described by an equation. This can e.g. be a partial differential equation. As shown in the following, it is possible to formulate the equation for the crystallinity field in such a way, that the SPE regrowth is well described.

FIG. 1 shows the calculation of following typical situation. For simplicity reasons only one dimension is presented. At the beginning of a high temperature treatment a part of the semiconductor is crystalline (initial value of the field equals 1), and another part of the material is amorphous (initial value of the field equals 0). For the calculation of FIG. 1 a high temperature treatment at 740° C. was assumed, which is typical for nitride deposition in silicon device fabrication. Starting at the initial interface between crystalline and amorphous regions, the amorphous region will recrystallize. In the model, recrystallization means that the value of the crystallinity is raised from initially 0 to 1. This recrystallization takes place predominantly at the transition region between crystalline and amorphous part of the device. FIG. 1 shows that during SPE regrowth, the transition region is shifted towards the amorphous side of the amorphous/crystalline interface, and that at the end of the regrowth, the whole semiconductor is crystalline.

In this embodiment, the following equation for the data field crystallinity, which has all desired properties and can be solved numerically by a process simulator, is used:

$$\frac{dC}{dt} = div(\alpha \cdot grad(C)) + \beta \cdot C \cdot (1-C) \cdot (C-\gamma). \tag{1}$$

Here, C represents the crystallinity and is a function of space coordinates and time, dC/dt is the time derivative of C, div and grad are spatial differential operators, and $\alpha$, $\beta$ and $\gamma$ are parameters which may depend on the temperature. In the simulation for FIG. 1, at 740 C, the following values were used: $\alpha=10^{-11}$ cm$^2$/s, $\beta=150$ s$^{-1}$, $\gamma=0.25$. These values are chosen such that the velocity $v_{SPE}$ of recrystallization (i.e. the velocity of the moving interface) equals the value for undoped silicon presented in FIG. 24 of G. L. Olson and J. A. Roth, 'Kinetics of Solid Phase Crystallization in Amorphous Silicon', Mat. Sci. Rep. Vol 3, Nr. 1, June 1988, pp. 1–78. The width of the transition region between crystalline and amorphous phase is about 15 nm.

The speed of SPE regrowth depends on the temperature and may also depend on the local values of other data fields, which are used for the process simulation, such as for example the mechanical stress or the concentration of dopant atoms. This is taken into account by the choice of the values for $\alpha$, $\beta$, and $\gamma$. $\alpha$, $\beta$, and $\gamma$ can be functions of the temperature and of the local dopant concentration. However, in the simulations for FIGS. 1 and 2, which are for annealing at constant temperature, constant values for $\alpha$, $\beta$, and $\gamma$ were used, ignoring a possible influence of the dopant concentration on SPE regrowth velocity.

Dopant atoms, which are situated in or near the transition region between crystalline and amorphous silicon are subject to an additional driving force. For dopant atoms, which energetically prefer to be in the amorphous part of the semiconductor, the driving force will be directed towards the amorphous part of the crystalline—amorphous interface.

For the origin of such a driving force, one can assume an analogous origin as in the case of the electrical potential acting as a driving force for charged particles. The gradient of the electrical potential (in other words: the electric field) drives positively charged particles towards regions of low electrical potential and negatively charged particles towards regions of high electrical potential. In the case of the crystallinity as the driving force of diffusion, a dopant species may have a lower potential energy in amorphous regions, where the value of crystallinity is 0, and a higher potential in the crystalline region, where the value of the crystallinity is 1. As for the electric field, the difference in the potential energy causes a driving force, which is proportional to the gradient of the potential energy, and directed in opposite direction of such a gradient.

A possible equation for the driving force $F_{new}$ on dopant diffusion due to different values of crystallinity in different regions of the semiconductor is:

$$F_{new} = -\epsilon \cdot grad(C) \tag{2}$$

with C being the crystallinity and $\epsilon$ being a parameter, which depends on the difference of potential energy of an atom in the crystalline part and in the amorphous part of the semiconductor. Such a new driving force can be applied in the process simulation of SPE regrowth. In this example, $\epsilon$=2 eV for indium atoms was used.

Figure 2:
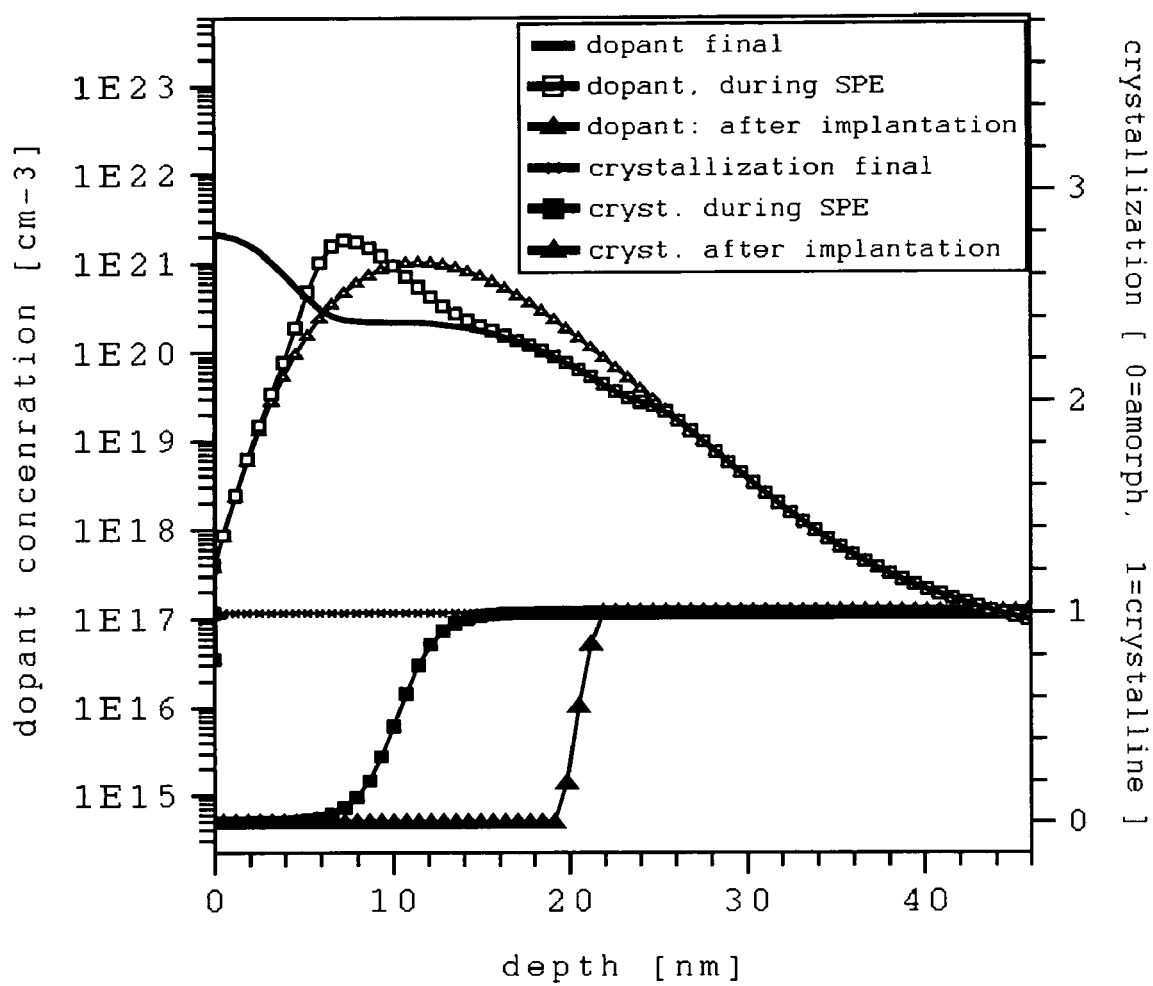
FIG. 2 shows the dopant distribution in said silicon device before, during and after SPE regrowth and the corresponding state of the phase interface.

The driving force causes a flux of dopant atoms, therefore a new term is added to the equation which describes the time evolution of the dopant concentration during high temperature treatments. The dopant flux $\phi$ of some dopant A, caused by the driving force $F_{new}$, can be denoted as:

$$\phi = -\text{grad}(C) \cdot \delta \cdot \epsilon \cdot A_{conc.} \quad (3)$$

where $\delta$ is a parameter, which describes the mobility of dopant atoms A. As shown in FIG. 2, $A_{conc.}$ is a function of location and time. For the calculation of FIG. 2 (annealing at 600° C. after indium implantation), the value $\delta$=6.6·10$^{-14}$ cm$^2$/eVs for indium atoms was used, and the additional indium flux caused by the gradient of the crystallinity was:

$$\phi_{indium} = -\text{grad}(C) \cdot 1.32 \cdot 10^{-13} \cdot In_{conc.}$$

The flux $\phi$ gives rise to an additional term in the equation, which describes the time evolution of the concentration of the dopant A during high temperature treatment:

$$\frac{dA_{conc.}}{dt} = -div(\phi) + \text{other terms} = div(\text{grad}(C) \cdot \delta \cdot \varepsilon \cdot A_{conc.}) + \text{other terms} \quad (4)$$

In equation (4), 'other terms' represents other contributions to the time evolution of $A_{conc.}$, which can be independent of the crystallinity field C. E.g., 'other terms' can include the conventional diffusion of dopant atoms in silicon at high temperatures. div($\phi$) is the divergence of the flux and equals the change of dopant concentration due to the flux at each point in the semiconductor.

In the example simulation for FIG. 2, indium diffusion was modeled with the Fick's diffusion law, and it was assumed that the indium diffusivity depends on the temperature and on the crystallinity. In this case, 'other terms' can be expressed as div(D(T,C) grad($A_{conc.}$)), where D(T) is the dopant diffusivity, depending on the temperature and crystallinity. In this case, equation (4) becomes:

$$\frac{dIn_{conc.}}{dt} = -div(\text{grad}(C) \cdot \delta \cdot \varepsilon \cdot In_{conc.}) + div(D(T, C) \cdot \text{grad}(In_{conc.})) \quad (5)$$

where $In_{conc.}$ is the indium concentration

FIG. 2 shows the calculated dopant profile after implantation and after SPE regrowth at 600° C., using the described procedure. For this calculation the following two differential equations were solved with the process simulator FLOOPS.

Crystallinity equation:

$$\frac{dC}{dt} = \alpha \cdot div(\text{grad}(C)) + \beta \cdot C \cdot (1 - C) \cdot (C - \gamma). \quad (1)$$

With following values at 600° C.: $\alpha$=3·10$^{-14}$ cm$^2$/s, $\beta$=4.8 s$^{-1}$, $\gamma$=0.3

Equation for indium concentration:

$$\frac{dIn_{conc.}}{dt} = div(\text{grad}(C) \cdot \delta \cdot \varepsilon \cdot In_{conc.}) + div(D(T, C) \cdot \text{grad}(In_{conc.}))$$

With the following parameters at 600° C.:

$\delta \cdot \epsilon$=1.32·10$^{-13}$ cm$^2$/s $D(T,C)$=4.655·10$^{-18}$·(1.0+3·10$^7$·(1−C)·C) cm$^2$/s.

The diffusivity in crystalline silicon (C=1), 4.655·10$^{-18}$ cm$^2$/s, is multiplied by a factor, which is 1 in perfectly crystalline regions and in perfectly amorphous regions, and much larger than 1 in the transition region, where 0<C<1. In this example, a factor of 3.10$^7$ was used. That means that in the simulation model, an increased indium diffusivity is assumed in the transition region between amorphous and crystalline silicon where the dopants are rearranged from the amorphous to the crystalline lattice structure.

FIG. 2 shows how the dopants have been moved during the annealing steps towards the surface of the medium.

Equations (1) and (5), or—more general—equations (1) and (4), can be integrated into any process simulator, which uses continuous fields for the description of dopant fields. The equations can be solved with standard numerical methods. As the initial distribution of the dopants and the initial value of the crystallinity field are known after steps 1–3 of the procedure, the partial differential equations (1) and (4) allow to calculate the final distribution of dopants at the end of a treatment, such as a high temperature annealing step.

I claim:

1. A method for determining the movement of particles in a medium, under the influence of a changing interface between two neighboring phases of the medium, comprising the steps of
    (a) Determining the spatial evolution of said interface over time; and
    (b) Determining the movement of said particles in dependence upon the spatial evolution of the phase interface as determined in step (a).

2. A method according to claim 1, comprising the further step of
    (c) determining the distribution of the particles at a certain time.

3. A method according to claim 1, comprising the further step of determining the distribution of the particles at a steady state position of the phase interface.

4. A method according to claim 1, wherein the method is performed on the basis of a model defining the medium as having a phase interface described as a smooth transition over a non zero range of the medium.

5. A method according to claim 1, wherein the method is performed on the basis of a model defining the medium as having a phase interface which is described by a discontinuous transition between the two phases.

6. A method according to claim 4, wherein the method is performed on the basis of a model wherein the medium is described by a data field having a first value for the first phase and a second value for the second phase and values in between representing the smooth transition.

7. A method according to claim 6, wherein the spatial evolution of said data field over time is calculated by a differential equation.

8. A method according to claim 6, wherein the method is applied for a medium of a material having at least one crystalline phase and where the data field describes the crystallinity of the medium at a plurality of points in the medium.

9. A method according to claim 8, wherein the determination of step (a) is determined by a differential equation of the form $$\frac{dC}{dt} = div(\alpha \cdot grad(C)) + \beta \cdot C \cdot (1 - C) \cdot (C - \gamma).$$

wherein C is the data field of the crystallinity of the material, div and grad are spatial differential operators and α, β and γ are parameters which describe environmental conditions of the simulation.

10. A method according to claim 5, wherein the spatial evolution of the phase interface is determined by the calculation of probabilities for regions adjacent to the phase interface to switch from one phase into the other in a certain time period, using a monte carlo type random algorithm.

11. A method according to claim 1, wherein said movement of the particles is calculated by a monte carlo type simulation of discrete particle hopping, where the hopping probability of a particle depends on the potential energy of the initial and the final particle position of the hopping event, and where the potential energy of the particle depends on the material phase.

12. A method according to claim 5, wherein the spatial evolution of the phase interface is calculated by means of a movement function of the discontinuity between the phases.

13. A method according to claim 1, wherein the spatial evolution of the phase interface is calculated in dependence upon a high temperature treatment of the medium.

14. A method according to claim 1, wherein the spatial evolution of the phase interface is calculated in dependence upon a potential difference between the two phases.

15. A method according to claim 1, wherein the spatial evolution of the phase interface is calculated in dependence upon the concentration of the particles.

16. A method according to claim 1, wherein said movement of particles is calculated in dependence upon a driving force induced by the difference of potential energy in the two phases.

17. A method according to claim 5, wherein the movement of the particles at the discontinuous transition between the two phases is determined in dependence upon an accumulation of particles at said transition and a particle transport which is proportional to the number of accumulated particles and to the velocity of the discontinuous transition between the two phases.

18. A method according to claim 1, wherein the method is performed for a medium made of a semiconductor material and having at least two different phases and the particles being dopants of the semiconductor.

19. A method according to claim 18, wherein the method is performed for a semiconductor having at least one crystalline and one amorphous phase and a phase interface in between.

20. A method according to claim 19, wherein the method is applied for at least one of the following processes:

dopant redistribution during solid phase epitaxial (SPE) regrowth

Indium dopant loss

Arsenic dopant loss

Fluorine dose loss

Arsenic dopant activation during SPE regrowth

Boron uphill diffusion during SPE regrowth.

21. A method according to claim 18, wherein the method is performed for a semiconductor having at least one solid and one liquid phase and a phase interface in between.

22. A method according to claim 18, wherein the method is applied on dopant redistribution during liquid phase epitaxial (LPE) regrowth.

23. A method according to claim 22, wherein the method is applied on dopant redistribution during a float zone purification process.

24. A method according to claim 18, wherein the method is applied for dopant redistribution during a laser annealing process in which the laser melts or amorphizes an illuminated region of the semiconductor material.

25. A computer program product comprising software code port ions for performing a method according to claim 1 when run on a computer.

26. A set of data indicating a distribution of the particles at a particular point in time, produced by a method including the steps of claim 1.

27. A semiconductor device produced using a method including the steps of claim 1.

28. A method according to claim 1, wherein the step of determining the spatial evolution of the interface over time comprises the step of determining the movement of the position of the interface over time.

29. A method according to claim 1, wherein the step of determining the spatial evolution of the interface over time comprises the step of determining the range of the interface over time.

30. A method according to claim 1, wherein the movement of the particles is calculated in dependence upon a high temperature treatment of the medium.

31. A method according to claim 1, wherein the movement of the particles is calculated in dependence upon a potential energy difference between the two phases.

* * * * *

UNITED STATES PATENT AND TRADEMARK OFFICE
CERTIFICATE OF CORRECTION

PATENT NO. : 7,142,297 B2
APPLICATION NO. : 10/697982
DATED : November 28, 2006
INVENTOR(S) : Christoph Zechner Page 1 of 1

It is certified that error appears in the above-identified patent and that said Letters Patent is hereby corrected as shown below:

Column 9, line 50 Replace

" $\dfrac{dIn_{conc.}}{dt} = [[-]] div(grad(C) \cdot \delta \cdot \varepsilon \cdot In_{conc.}) + div(D(T,C) \cdot grad(In_{conc.}))$ " with -- $\dfrac{dIn_{conc.}}{dt} = div(grad(C) \cdot \delta \cdot \varepsilon \cdot In_{conc.}) + div(D(T,C) \cdot grad(In_{conc.}))$ --.

Signed and Sealed this

Twenty-second Day of May, 2007

JON W. DUDAS
*Director of the United States Patent and Trademark Office*